(12) United States Patent
Aberg

(10) Patent No.: US 9,616,515 B2
(45) Date of Patent: Apr. 11, 2017

(54) METHOD OF OPERATING A WELDING POWER SUPPLY AND A WELDING POWER SUPPLY

(75) Inventor: Per Aberg, Laxa (SE)

(73) Assignee: ESAB AB, Gothenburg (SE)

( * ) Notice: Subject to any disclaimer, the term of this patent is extended or adjusted under 35 U.S.C. 154(b) by 498 days.

(21) Appl. No.: 14/115,402

(22) PCT Filed: May 4, 2011

(86) PCT No.: PCT/EP2011/057149
§ 371 (c)(1),
(2), (4) Date: Feb. 6, 2014

(87) PCT Pub. No.: WO2012/149969
PCT Pub. Date: Nov. 8, 2012

(65) Prior Publication Data
US 2014/0138364 A1   May 22, 2014

(51) Int. Cl.
*B23K 9/10* (2006.01)
(52) U.S. Cl.
CPC .......... *B23K 9/1043* (2013.01); *B23K 9/1006* (2013.01); *B23K 9/1056* (2013.01)
(58) Field of Classification Search
CPC ...... B23K 9/091; B23K 9/093; B23K 9/1043; B23K 9/1075
See application file for complete search history.

(56) References Cited

U.S. PATENT DOCUMENTS

| 5,615,095 A * | 3/1997 | Reynolds ............. B23K 9/1043 219/130.4 |
| 2002/0104833 A1* | 8/2002 | Bradley ............. B23K 26/0884 219/121.63 |

FOREIGN PATENT DOCUMENTS

| EP | 0963805 A2 | 12/1999 |
| EP | 1681123 A2 | 7/2006 |
| EP | 2248621 A | 11/2010 |
| JP | 11-138265 A | 5/1999 |
| JP | 2002-361416 A | 12/2002 |
| WO | 2007-053137 A1 | 5/2007 |

OTHER PUBLICATIONS

International Search Report mailed Jan. 16, 2012 for PCT/EP2011/057149 filed May 4, 2011.

* cited by examiner

*Primary Examiner* — Brian Jennison

(57) ABSTRACT

A method of operating a welding power supply (20) during a welding process in which an electric arc (95) between a consumable electrode (94) and a work piece (102) is generated while feeding the consumable electrode (94) and moving the arc (95) in relation to the work piece (102) along a welding track (103), wherein a transition between a DC power output of the welding power supply and an AC power output of the welding power supply, or vice versa, is made without interruption of the welding process.

10 Claims, 4 Drawing Sheets

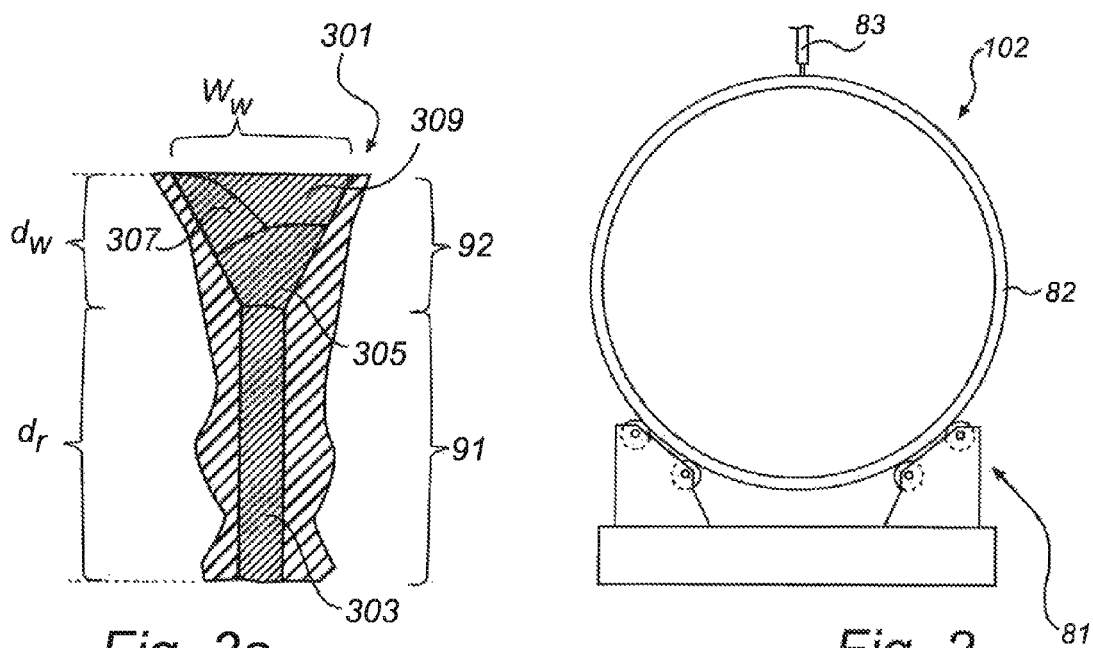
Fig. 3a
Fig. 2
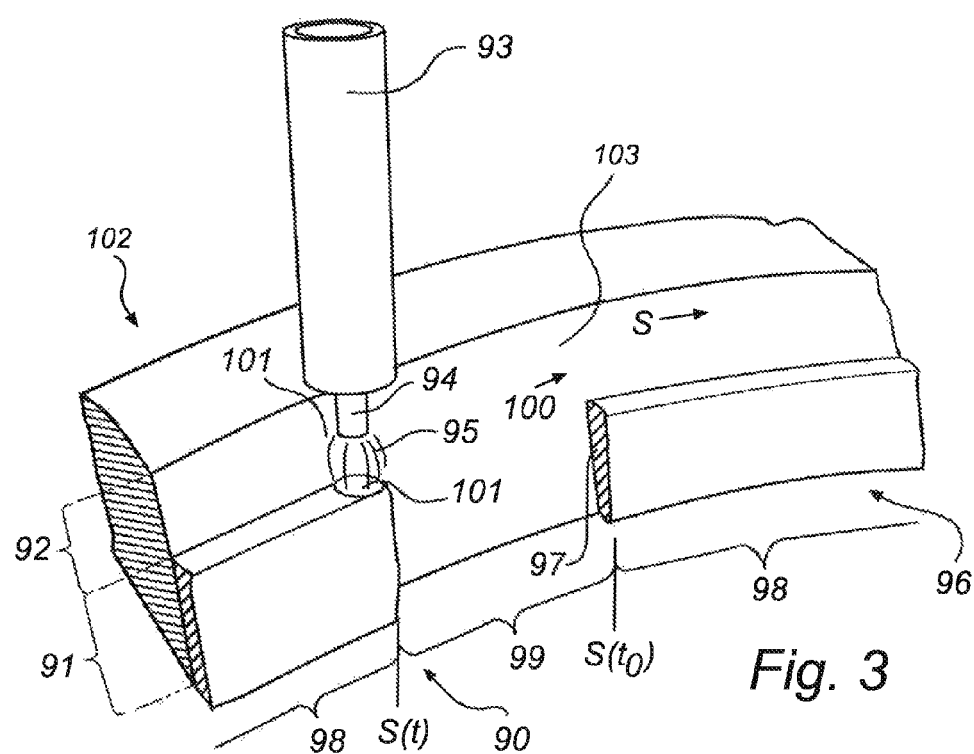
Fig. 3

METHOD OF OPERATING A WELDING POWER SUPPLY AND A WELDING POWER SUPPLY

TECHNICAL FIELD

The present invention relates to a method of operating a welding power supply. In particular the invention relates to a method of operating a welding power supply which may be set to generate a DC power output of the welding power supply as well as an AC power output from the same output terminal. The invention furthermore relates to a welding power supply which is designed to generate a DC power output of the welding power supply as well as an AC power output from the same output terminal.

BACKGROUND

In welding technology a diversity of welding processes are present. These processes include for example tungsten inert gas welding (TIG), MIG/MAG and submerged arc welding (SAW). In TIG technology an arc is generated between a non-consumable electrode and the work piece. If desired a metal filler is fed into the arc. The TIG technology is suitable for welding in thin materials, in particular welding of thin aluminum work pieces. In MIG/MAG and submerged arc welding, an arc is generated between a consumable electrode and a work piece. MIG/MAG is suitable for welding of all kinds of metals at medium thickness. In TIG and MIG/MAG welding a weld puddle generated by the arc is protected by a gas supplied from a shield cup arranged at a welding torch. In submerged arc welding (SAW) an arc is generated between a consumable electrode and a work piece under a protective layer of flux covering the work piece at the arc. MIG/MAG is suitable for welding of all kinds of metals where high deposition rates are required, such as when welding in thick materials.

In the field of welding different parameters may be adjusted to achieve a desired result. These parameters includes welding voltage, welding current, electrode feed speed and welding propagation speed.

Furthermore, welding processes may be performed by a direct current process with an output from the power source connecting the electrode to the negative potential, a direct current process with an output from the power source connecting the electrode to the positive potential or as an alternating current process where the electrode switches between electrode negative and electrode positive. Generally electrode negative provides for a wide weld bead with low penetration and electrode positive provides for a a narrow bead with deep penetration. The alternating current process can be seen as a process having properties in between the DC-negative and DC-positive process. Generally the alternating current has a base frequency of around the net frequency. Optionally, the frequency can be higher, that is the region of 200-400 Hz. High frequencies will generate losses in welding cables and is therefore not suitable for many applications.

Welding power sources that may operate in either DC mode or AC mode are previously known. One example is disclosed in U.S. Pat. No. 4,517,439 where separate AC and DC terminals are provided.

Even though the prior art is rich when it concerns improvements in control of the welding power supplies to generate weld seams with high quality, it is desirable to provide further improved methods for operating welding power supplies.

It is thus an object of the present invention to provide an improved method of operating a welding power supply during a welding process.

SUMMARY OF THE INVENTION

The object of further improving a welding process is achieved by a method of operating a welding power supply during a welding process according to claim 1.

According to the inventive method an electric arc between a consumable electrode and a work piece is generated while feeding a consumable electrode and moving the arc in relation to the work piece along a welding track. During the welding process a transition is made between a DC power output of the welding power supply and an AC power output of the welding power supply, or vice versa. Hence according to the invention the transition between a DC power output and an AC power output, or vice versa, is made without interruption of the welding process.

By, as is proposed by the inventive method, allowing a transition between AC and DC output during a welding process while feeding a consumable electrode and moving the arc in relation to the work piece along a welding track it is possible to adapt the weld process to rapidly changing welding conditions such as a transition between a root run and a following hot pass. When performing a root run a deep penetration is required in order to make a fully dense joint between two opposing end portions facing each other with a narrow gap in between. By operating the power supply to provide a DC-positive output deep penetration is ascertained. When the root run is completed it is often desirable to complete the weld seam by providing hot pass followed by one or more fill passes. In such circumstances the invention proposes to perform a shift to an AC process for a provision of one or more filler runs from a DC-positive electrode process completing the root run without interrupting the welding process. This means that the feeding of the consumable electrode as well as movement of the arc in relation to the work piece will continue at the transition. By avoiding interrupting the process it can be assured that the weld puddle is not solidified or cooled. Hence, fusion defects can be avoided at the location of the transition between the end of the root run and the beginning of the filler strings. According to prior art methods, chamfering may be needed in order to avoid possible fusion defects at the location of the start of the AC process following after the root run. By using the method according to the invention a time consuming chamfering process is be avoided.

A further advantage of the inventive process is that effective arc blow prevention may be performed at welding tracks having complex geometry, where arc blow occurs at an unacceptable level at certain segments of the weld track, while the arc blow is on a low level at other segments of the weld track. In such situations, a transition between a DC power output of the welding power supply and an AC power output of the welding power supply or vice versa may be made in dependence of the specific arc blow condition at the location. A DC power output may be used in the segments where the arc blow is low due to geometry and a transition to an AC process can be made without interruptions at segments where the geometry induces large arc blow. By allowing the transition to take place, the benefits of the DC process can be used for certain segments while a reduction of the arc blow due to the use of an AC process for other segments is allowed without interruption of the welding process.

It is therefore contemplated to optionally perform an assessment of a parameter representing arc blow at a welding location and to adjust a balance in dependence of the assessed parameter value.

At the transition between the AC and DC processes, the welding speed and the electrode feed speed may be maintained. This means that $v_{DC}(t0)=v_{AC}(t0)$, where $v_{DC}(t0)$ is the welding speed of the DC process at the time of transition t0 and $v_{AC}(t0)$ is the welding speed of the AC process at the time of transition. Similarly, $w_{DC}(t0)=w_{AC}(t0)$, where $v_{DC}(t0)$ is the electrode feed speed of the DC process at the time of transition t0 and $v_{AC}(t0)$ is the electrode feed speed of the AC process at the time of transition. Optionally, the electrode feed speed and the welding speed at steady state may be different from the electrode feed speed respectively the welding speed at the transition. This means that $v_{DC}(ts) \neq v_{DC}(t0)$ for ts≠t0, where ts are the time at which the process is run at steady state. Further, $v_{AC}(ts) \neq v_{AC}(t0)$ for ts≠t0, $w_{DC}(ts) \neq w_{DC}(t0)$ and $w_{AC}(ts) \neq w_{AC}(t0)$. The transition between the AC and DC processes can be smoothened by allowing ramps of the electrode feed speed at the transition. In the event the location of a discontinuity at which the process should change from AC to DC is known prior to arriving at the discontinuity, the ramp can be distributed on both sides of the transition In order to generate a suitable weld an AC balance value may be set in order to provide an appropriate penetration value for a weld process to be performed. The AC balance is a ratio between the electrode positive and electrode negative. The AC balance B is defined as proportion of electrode positive during a weld cycle. A balance of 100% DC positive has no DC negative component in a weld cycle. A balance of 0% DC positive has no DC positive component in a weld cycle. In an embodiment of the invention, a balance between positive electrode potential and negative electrode potential during a welding cycle is thus continuously adjustable between DC-negative electrode and DC-positive electrode via the AC power output. By allowing a continuously adjustable balance between 0 and 100% DC-positive electrode at an AC process, the character of the arc can be suitable adapted to the welding conditions.

In one embodiment of the invention, it is therefore suggested to assess a surface profile of the weld bead at a welding location and adjust the balance in dependence of the surface profile at the welding location. The assessment may be based on a predefined map including information of a surface profile as a function of the welding location. The surface profile is the geometry of the weld track at the welding location. In the assessment, a desired welding penetration profile may be retrieved for the welding location where after the balance may be set in dependence of the desired welding penetration profile at the location.

The assessment may include determining of a current welding location and retrieving a value representing the desired balance at the current welding location.

Optionally a sensor may be used to determine a surface profile of the welding track at the welding location and the balance may be set in accordance with the detected surface profile.

BRIEF DESCRIPTION OF DRAWINGS

Embodiments of the invention will be described in further detail below with reference to appended drawings, where:

FIG. 2 shows a schematic drawing of a pipe welding process, FIG. 3 shows a schematic drawing of a weld seam including a root portion at an area where a transition from an uncompleted root run to a completed root run is located, FIG. 3a shows a symbolic drawing of a weld track having a surface profile with a wedge portion and a root portion, FIG. 6 shows a schematic map of a welding process along a track.

DETAILED DESCRIPTION OF AN EMBODIMENT OF THE INVENTION

Figure 1:
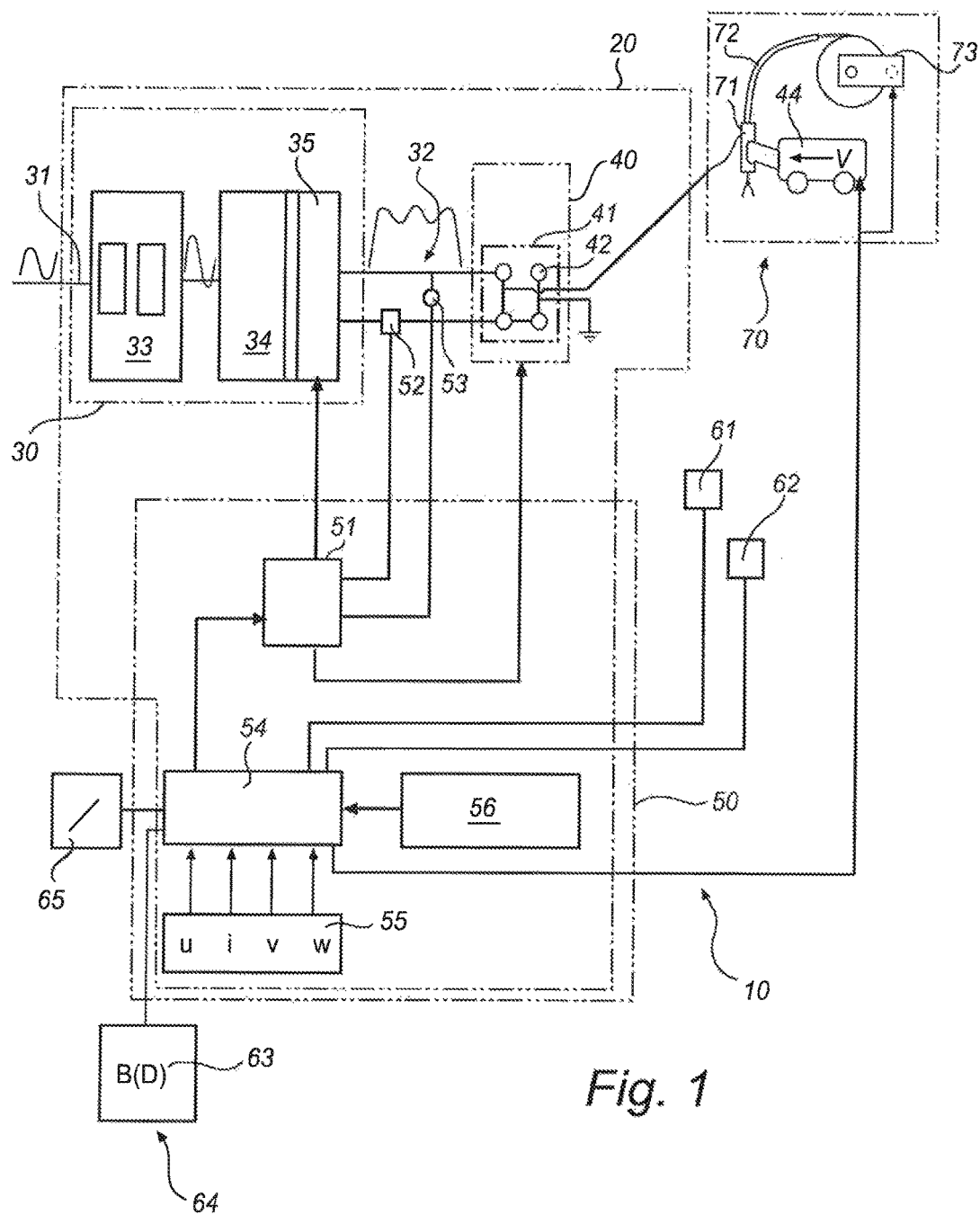
FIG. 1 shows a schematic drawing of a welding arrangement according to the invention.

FIG. 1 shows a welding arrangement 10 suitable for use in a method according to the invention. The welding arrangement includes a welding power source 20 capable of operating in DC mode as well as AC mode. The welding power supply is suitably an inverter power source which may be of a design as presented in U.S. Pat. No. 5,710,696. The power source includes a DC stage 30 connected to an AC input 31 and a DC output 32. The DC stage 30 includes a transformer stage 33 which generates a low voltage high current output to a rectifier stage 34, which may be designed by a diode bridge and a capacitor. The output from the rectifier stage is provided to a switching regulator 35 including switches which provides a chopped DC output signal of the output from the rectifier circuit. The chopping frequency is generally around 10-25 kHz.

The output from the switching regulator 35 is fed to an AC stage 40 formed by an inverter circuit 41. The inverter circuit 41 includes a set of switches 42 enabling transformation from the DC input to an AC output in a conventional manner as disclosed in U.S. Pat. No. 5,710,696. When operating in DC mode the inverter circuit 41 is controlled to provide a constant polarity DC output. This is performed by not switching between the states of the switches 42. When operating in DC mode, either a DC negative output or a DC positive output may be provided depending on the selected control of the switches 42.

A control arrangement 50 is arranged to control the output of the welding power supply 20. The control arrangement includes a digital signal processor 51. The digital signal processor 51 serves to control the shape of current pulses by controlling the switches of the switching regulator 35. For this purpose the digital signal processor 51 may include a pulse width modulator under control of a wave shaper located in a general controller 54. The control of the switches may be performed in a manner as disclosed in U.S. Pat. No. 5,715,150.

The digital signal processor 51 receives as input signals current and voltage output values detected by sensors 52, 53 at the output from the inverter 41 or from the switching regulator 35. Furthermore the general controller 54 determines desired values of the welding voltage V, welding current I, electrode feed speed, w, and welding speed v. These values may be set by an operator from an operator interface 55, or from a map 56 containing preset welding parameters depending on selected weld cases.

The digital signal processor 51 is furthermore responsible for controlling the balance of an AC output from the inverter circuit 41, if provided. This control is performed by setting switching times of the switches 42.

Optionally the controller receives an input from a welding profile sensor 61, which determines the profile of a surface at a welding location. The welding profile sensor may determine a desired weld penetration that is a welding depth at the welding location. The welding depth may be defined as a distance between a highest and lowest point within a welding area, where the welding area corresponds to a weld puddle at the welding location. Since welding may be performed with a work piece inclined at any desired angle with respect to the vertical plane, the depth is measured in the direction between the arc and the point of the weld puddle having the deepest penetration. In the case of a weld performed in the vertical plane, the depth will be measured in the vertical plane. In the root run the depth will correspond to the thickness of the root, while at the filler rounds the depth will depend on the weld profile.

Instead or complementary to the weld profile sensor 61 a weld profile map 62 may be provided. The weld profile map includes data representing a desired welding depth or a desired balance as a function of the welding location or a combination thereof. Expressed in welding coordinates s, where s is a location along a welding track the map may be expressed as B(s) where B is the balance at a desired location providing a desired welding penetration D at a location s along a welding track. Alternatively the map may be expressed as D(s), where D(s) is a desired penetration at a location s along a welding track. In this event, a map between a desired balance and a desired welding penetration profile should be provided. The map 63 between a desired welding penetration profile D and a desired balance value may be stored in a memory area 64 accessible for the general controller 54. The map 63 is created from experimental results from different weld cases. Optionally a ramp controller 65 is connected to the general controller 54. The ramp controller controls the process parameters welding voltage V, welding current I, electrode feed speed, w, and welding speed v at a detected discontinuity along the welding track.

The welding arrangement further includes a welding robot 70 including at least one welding head 71 through which a consumable electrode 72 is fed. The welding robot 71 further includes an electrode feeder 73 arranged to feed the welding consumable electrode 72 at a desired electrode feed speed w. The welding arrangement includes a propulsion unit arranged to generate a relative movement between the work piece and the welding head. The propulsion unit may be provided by a movable welding robot, which may propagate in relation to the work piece or by arranging the work piece to be movable. In FIG. 1, the welding robot 70 is movable, while in FIG. 2, which shows an arrangement for pipe welding including a pipe support 81 on which a pipe 82 is located. A fixed welding head 83 is arranged to provide an arc at a specified location. The pipe support 81 includes one or more driven rollers which rotates the pipe.

FIG. 3 shows a schematic drawing of a weld seam 90 including a root portion 91 and a wedge portion 92 of a work piece 102. The root portion should be welded in a root run providing a complete root weld. The welding is preformed along a welding track 103. A welding head 93 guides a consumable electrode 94 at which an arc 95 is formed. The schematic drawing shows an area 96 where a transition 97 from an uncompleted root run 99 to a completed root run 98 is located. The welding is performed in the direction indicated by the arrow 100. At a current welding location S(t) welding is performed at an open root. At the location $S(t_0)$ a transition is made to a location where a completed root is present. Welding should here be continued in the wedge portion by supplying filler strings.

In FIG. 3a a symbolic drawing of a surface profile 301 having with a wedge portion 92 and a root portion is shown. The surface profile may contain information about both the wedge portion, which is to be welded in a later subsequent or subsequent runs, and the root portion which is to be welded in an initial run. That is the surface profile 31 may contain information relating to the ongoing and coming welding runs. Alternatively the surface profile only contains information relating to the coming run. The surface profile may contain information relating to the depth and width of the gap which is to be joined. A complete surface profile as exemplified in FIG. 3a may contain information regarding the depth of the root $d_r$, the width of the root $w_r$, the wedge portion $d_w$, and the width of the wedge portion $w_w$. In FIG. 3a a root string 303 formed during a root pass and filler strings 305, 307, 309 formed during subsequent passes are shown.

When performing a root run a deep penetration is required in order to make a fully dense joint between two opposing end portions facing each other with a narrow gap in between. By operating the power supply to provide a DC-positive output deep penetration is ascertained. When the root run is completed it is often desirable to complete the weld seam by providing one or more filler strings on top of the root run. In such circumstances the invention proposes to perform a shift to an AC process for a provision of one or more filler runs from a DC-positive electrode process completing the root run without interrupting the welding process. This means that the feeding of the consumable electrode as well as movement of the arc in relation to the work piece will continue at the transition. By avoiding interrupting the process it can be assured that the weld puddle 101 is not solidified or cooled. Hence, fusion defects can be avoided at the location of the transition between the end of the root run and the beginning of the filler strings. According to prior art methods, chamfering may be needed in order to avoid possible fusion defects at the location of the start of the AC process following after the root run. By using the method according to the invention a time consuming chamfering process may be avoided.

At the transition between the DC and AC processes, the welding speed and the electrode feed speed is maintained. The transition takes place at the location to where the discontinuity from the root run to the filler run is located. This means that $v_{DC}(t0)=v_{AC}(t0)$, where $v_{DC}(t0)$ is the welding speed of the DC process at the time of transition t0 and $v_{AC}(t0)$ is the welding speed of the AC process at the time of transition. Similarly, $w_{DC}(t0)=w_{AC}(t0)$, where $v_{DC}(t0)$ is the electrode feed speed of the DC process at the time of transition t0 and $v_{AC}(t0)$ is the electrode feed speed of the AC process at the time of transition. Optionally, the electrode feed speed and the welding speed at steady state may be different from the electrode feed speed respectively the welding speed at the transition. This means that $v_{DC}(ts) \neq v_{DC}(t0)$ for $ts \neq t0$, where ts are the time at which the process is run at steady state. Further, $v_{AC}(ts) \neq v_{AC}(t0)$ for $ts \neq t0$, $w_{DC}(ts) \neq w_{DC}(t0)$ and $w_{AC}(ts) \neq w_{AC}(t0)$. The transition between the AC and DC processes can be smoothened by allowing ramps of the electrode feed speed at the transition. In the event the location of a discontinuity at which the process should change from AC to DC is known prior to arriving at the discontinuity, the ramp can be distributed on both sides of the transition.

Figure 4:
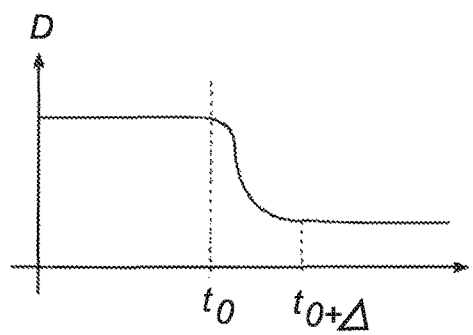
FIG. 4 shows a diagram of a weld depth as a function of the position along a weld track.

In FIG. 4 a desired welding penetration profile as a function of a location along a welding track is disclosed. At the location $t_0$ where a discontinuity between a root run and a filler run is present. The desired welding penetration profile D falls at this location from a high value corresponding to a DC-positive output power mode to a lower value corresponding to an AC output having a certain balance B.

Figure 5:
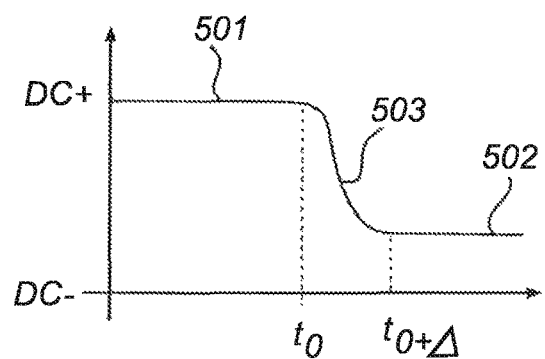
FIG. 5 shows a diagram with a desired balance as a function of the welding location.

A corresponding diagram with a desired balance B as a function of the welding location is disclosed in FIG. 5. The transition 503 from the DC-positive output power mode 501 to the AC output power mode 502 may contain a ramp continuing over several AC pulses or be performed in a single pulse, where the process is changed from a steady state DC-positive process to a steady state AC process having a certain balance value via a transition phase with a change of the balance value over the several pulses. This is indicated by the smooth portion between the DC-positive process and the steady state AC process occurring after $t_0+\Delta$.

Effective arc blow prevention may be performed at welding tracks having complex geometry, where arc blow occurs at an unacceptable level at certain segments of the weld track, while the arc blow is acceptable at other segments of the weld track. Here a transition between a DC power output of the welding power supply and an AC power output of the welding power supply, or vice versa, in dependence of the specific arc blow condition at the location. A DC power output may be used in the segments where the arc blow is low due to geometry and a transition to an AC process can be made without interruptions at segments where the geometry induces large arc blow. By allowing the transition to take place, the benefits of the DC process can be used for certain segments while a reduction of the arc blow due to the use of an AC process for other segments is allowed without interruption of the welding process.

It is therefore contemplated to optionally perform an assessment of a parameter representing arc blow at a welding location and to adjust a balance in dependence of the assessed parameter value. This may be possible by either detecting an arc blow condition and changing the output power from DC to AC where arc blow is detected or by providing a map over the desired welding condition as a function of the position along a welding track, where at locations sensitive to arc blow a transition from DC output to AC output is made without interrupting the welding process.

In FIG. 6 a schematic map of a welding process along a track defined along a coordinate S is indicated. The map includes two areas A1 and A2 where a DC-positive process is run and three areas A3, A4, A5 with different balance values are performed.

Figure 7:
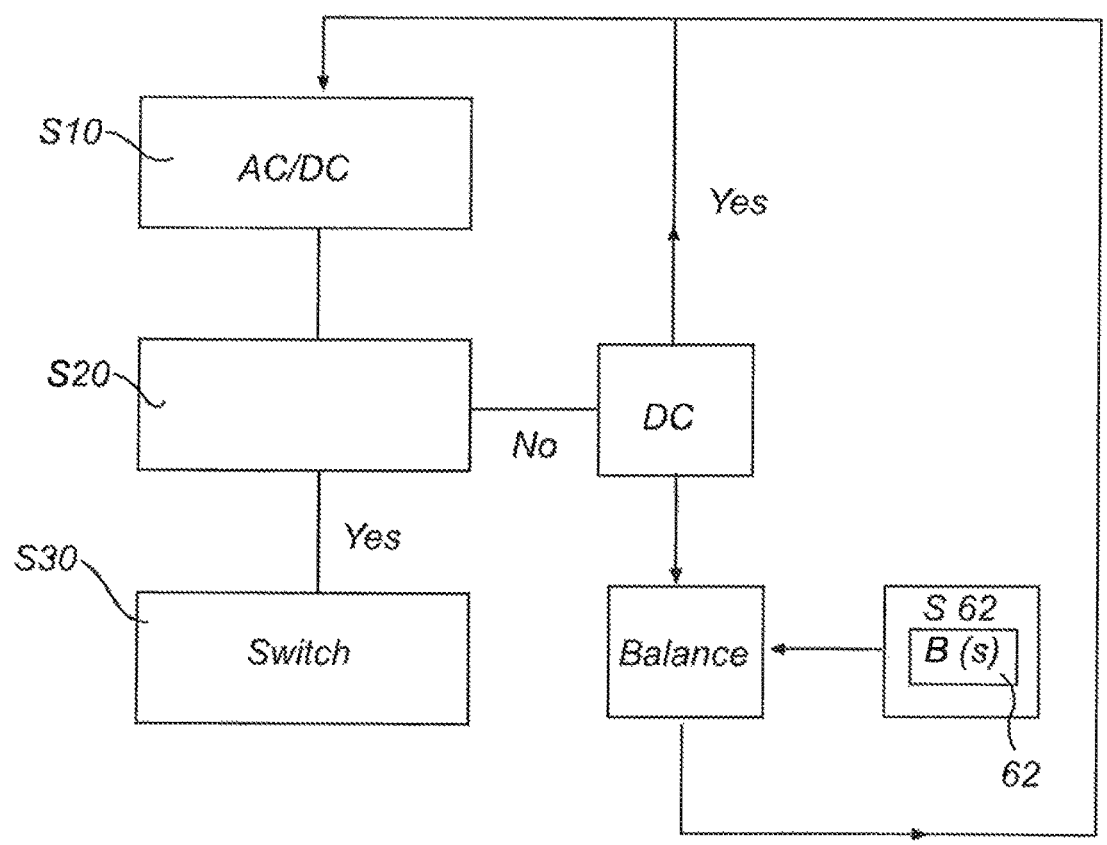
FIG. 7 shows a schematic flowchart of an embodiment of the invention.

In FIG. 7 a schematic flowchart of an embodiment of the invention is shown. In a first process step S10 an AC or DC output power process is run at a electrode feed speed w and a welding speed v. At a step S20 it is determined whether a discontinuity is present, such as a transition from a root run to a filler run or from an acceptable arc blow condition to an unacceptable arc blow condition takes place. The discontinuity can be detected by sensors or by a map indicating a discontinuity. If a discontinuity is present the process will in a step 30 change from DC to AC or vice versa depending on the nature of the discontinuity. If a discontinuity is not present, the process will return to step 10 if the current process is a DC process. If the current process is an AC process the balance value may be determined in a process step S50. The desired balance value may be obtained from a map 62.

The welding process may include a root pass and one or more fill passes, wherein said root pass is made with a DC-positive electrode. The fill passes are made with an AC power output, and that a transition between the DC-positive electrode and the AC power output is made without interruption of the welding process.

The welding process may thus include the steps of performing a root pass with a DC-positive electrode, determining that the root pass is completed, and switching to an AC power output when said root pass is completed without interrupting the welding process.

The process allows for an adjustable balance between negative electrode potential and positive electrode potential during a welding cycle, which balance may be continuously adjustable between DC-negative electrode and DC-positive electrode via the AC power output.

In a step S60 a surface profile of the welding track at a welding location is assessed and that the balance is adjusted in dependence of the surface profile at the welding location. In one embodiment the assessment is based on retrieving a desired welding penetration profile at the welding location and setting the balance in dependence of the desired welding penetration profile at the location. Optionally the assessment is based on a predefined map including information of the surface profile as a function of the welding location.

Optionally assessment includes determining of a current welding location and retrieving a value representing the desired balance at the current welding location. Optionally a sensor determines a surface profile of the welding track at the welding location.

The invention claimed is:

1. A method of operating a welding power supply during a welding process in which an electric arc between a consumable electrode and a work piece is generated while feeding the consumable electrode and moving the arc in relation to the work piece along a welding track, wherein the method comprises:
   receiving profile information, including at least a weld profile map, the weld profile map including data representing a desired welding depth, a desired balance as a function of the welding location, or a combination thereof, wherein the desired balance comprises a ratio between electrode positive and electrode negative; and
   based upon the profile information, performing a first transition between a DC positive output power mode of the welding power supply and an AC output power mode of the welding power supply, and performing a second transition between the AC output power mode of the welding power and the DC positive output power mode of the welding power, wherein the first transition and the second transition are made without interruption of the welding process.

2. The method of operating a welding power supply according to claim 1, wherein a balance between a positive electrode potential and a negative electrode potential during a welding cycle is continuously adjustable between a DC-negative electrode and a DC-positive electrode via the AC power output.

3. The method of operating a welding power supply according to claim 1, wherein the receiving the profile information comprises determining a surface profile of the welding track at a welding location, and wherein a balance between a positive electrode potential and a negative electrode potential during a welding cycle is adjusted depending on the surface profile at the welding location.

4. The method of operating a welding power supply according to claim 3, wherein the receiving the profile information comprises retrieving a desired weld penetration profile at the welding location, and wherein the balance is set depending on the desired welding penetration profile at the location.

5. The method of operating a welding power supply according to claim 4, wherein the weld profile map comprises a predefined map including information of the surface profile as a function of the welding location.

6. The method of operating a welding power supply according to claim 5, wherein the receiving the profile information further includes determining a current welding location and retrieving a value representing a desired balance between a positive electrode potential and a negative electrode potential during a welding cycle at the current welding location.

7. The method of operating a welding power supply according to claim 4, wherein the receiving profile information further comprises receiving information from a sensor, wherein the sensor determines a surface profile of the welding track at the welding location.

8. The method of operating a welding power supply according to claim 1, wherein said welding process includes a root pass forming a root string and one or more fill passes forming filler strings, wherein the root pass is made with a DC-positive electrode, the fill passes are made with an AC power output, and a transition between the DC-positive electrode and the AC power output is made without interruption of the welding process.

9. The method according to claim 1 including the steps of performing a root pass with a DC-positive electrode, determining that the root pass is completed, and switching to an AC power output when the root pass is determined to be completed without interrupting the welding process.

10. The method according to claim 1 including assessing a parameter representing an arc blow at a welding location and adjusting a balance depending upon a value of the assessed parameter.

* * * * *